United States Patent [19]

Nagasaki et al.

[11] Patent Number: 5,117,315
[45] Date of Patent: May 26, 1992

[54] SYSTEM AND METHOD FOR STARTING ROTATION OF A DISC IN A DISC STORAGE UNIT

[75] Inventors: Tatsutoshi Nagasaki; Takashi Miyashita; Akihiko Yanagisawa, all of Kawasaki, Japan

[73] Assignee: Fuji Electric Co., Ltd., Kanagawa, Japan

[21] Appl. No.: 523,553

[22] Filed: May 15, 1990

[30] Foreign Application Priority Data

May 17, 1989 [JP] Japan ................................. 1-123596

[51] Int. Cl.⁵ .............................................. G11B 15/18
[52] U.S. Cl. ............................. 360/71; 360/75; 360/69
[58] Field of Search ................ 360/71, 75, 69, 103

[56] References Cited

U.S. PATENT DOCUMENTS

| | | | |
|---|---|---|---|
| 4,542,429 | 9/1985 | Nishida et al. | 360/75 X |
| 4,833,550 | 5/1989 | Takizawa et al. | 360/75 |
| 4,897,743 | 1/1990 | Kohno | 360/103 X |
| 4,969,057 | 11/1990 | Inomato et al. | 360/69 X |

FOREIGN PATENT DOCUMENTS 57-60707 12/1982 Japan .
62-140286 6/1987 Japan .
63-155479 6/1988 Japan .

*Primary Examiner*—John H. Wolff
*Attorney, Agent, or Firm*—Spencer, Frank & Schneider

[57] ABSTRACT

A disc storage unit includes a processor for checking whether or not rotation of a disc occurs, head actuator for slightly displacing the head by a predetermined minute amount. At first, the disc is started and then the processor detects presence or absence of rotation of the disc, and the head is displaced slightly in a state in which driving force is applied to the disc by the head actuator.

9 Claims, 3 Drawing Sheets

SYSTEM AND METHOD FOR STARTING ROTATION OF A DISC IN A DISC STORAGE UNIT

BACKGROUND OF THE INVENTION

1. Field of the Invention

The present invention relates to a system and method for starting rotation of a disc in a disc storage unit such as a hard disc unit, and more particularly to a system and method for starting rotation of a disc smoothly when it is difficult to be driven due to adsorption or adhesion of a head.

2. Description of the Prior Art

Disc storage units have been widely used not only in so-called office computers but also recently in personal computers and word processors. At present magnetic recording type disc storage units are mainly used although it is expected that attention will be paid to opto-magnetic recording types in the future. As is well known to one skilled in the art, in a magnetic disc storage unit, data information is read out and written from and into a magnetic recording medium on a disc via a head, which is a kind of a magnetic transducer. In its active state, the head either contacts a surface of the disc as is the case of a floppy disc or is slightly lifted from a surface of the disc by air pressure as is the case with a hard disc.

Even in the latter case, however, the air pressure for lifting the head is generated by rotation of the disc and therefore the head is in contact with the surface of the disc in a stop mode when the disc is stationary, and the head sometimes, though not so often, adsorbs or adheres to the surface of the disc in the stop mode, with the result that the disc cannot be driven smoothly at the time of starting the operation.

The above-described problem can be solved by a conventional lifter mechanism whose main components are as shown in FIGS. 1A and 1B. FIG. 1A is a plan view of the lifter mechanism and FIG. 1B is a side view of the lifter mechanism. A disc 1 is provided on the respective surfaces thereof with a head 2 which is usually supported by an arm 3 in the form of a thin plate spring. In the example shown a rod-like lifter 9 is operated in the directions indicated by arrows so that the head 2 can be lifted from the surface of the disc 1. This type of lifter was originally intended to separate the head from the surface of the disc while the disc is in a stop mode. The mechanism of this type makes it possible to separate the head adsorbed by the surface of the disc and start the disc.

However, remarkable popularization of disc storage units is accompanied by increasing demand for reducing their price and for making their construction as simple as possible to improve reliability in operation. At present, there is used mainly a so-called CSS (contact start stop) system which is free of such a specific structure as the above-described lifter mechanism; that is, the head is in contact with the surface of the disc while it is stopped and when it is to be started the disc is started in this state.

Furthermore, in disc storage units with large capacity as recently used, the flatness of the surface of the disc has been extremely improved in order to decrease the amount of lifting of the head to thereby increase its recording density. This has disadvantageously increased the tendency for a sliding surface of the head to be adsorbed on the surface of the disc more readily than is observed conventionally due to influences of humidity and the like. In the case of the CSS system, it is often the case that the surfaces of the disc are protected with a lubricant or the like in order to prevent damage which would be caused by the sliding of the head particularly while it is being started or stopped, with the result that the head tends to be adsorbed on the surface of the disc.

In the case where such adsorption or adhesion occurs in the CSS type disc storage units, not only can the disc not be started but also the surface of the disc may be damaged by the head due to considerable distortion of the arm in the form of a thin plate spring which supports the head if the disc is forcibly started by increasing torque of a spindle motor for driving. For this reason, there have been used conventional spindle motors which can be started at extremely low speed and high torque, by at first forcibly separating or peeling off the head from the surface of the disc forcibly before it is accelerated to a high speed.

Other solutions for solving the problem involved in the CSS type hard disc units or floppy disc units are known. For examples a method in which a head is displaced to remove adsorption or adhesion of the head before starting the disc is described in Japanese Patent Application Publication No. 57-60707 and Japanese Patent Application (Laid-Open) No. 63-155479Further, Japanese Patent Application (Laid-Open) No. 62-140286 discloses a method in which a head displacement instruction is issued simultaneously time with the application of rotational drive to the disc, with the instruction being valid only for a predetermined period of time the case where the rotation of the disc is not detected.

In the method in which the above-described low speed, high torque starting spindle motor is used, another problem arises because the spindle motor becomes large in size, which leads to an increase in price, and a longer time is required for putting the disc in a state of constant speed, with result that start-up of the unit is delayed after an electric source is switched on. In addition, the above-described method is effective when the degree of adsorption or adhesion is relatively low but there still remains a problem that the surface of the disc tends to be damaged due to distortion of the head arm as described above when adsorption or the like becomes strong enough.

According to the method in which the head is displaced to remove adsorption or adhesion before starting the disc, there also occurs a problem that the start-up of the unit is certainly delayed by a time required for the displacement of the head, and that a time is prolonged in which the surface of the disc is abraded by the head. Since the head is almost always driven under an extremely light load without adsorption and adhesion, the head tends to run away from the radially outermost side or innermost side of the surface of the disc. Since the head is displaced to remove adsorption or adhesion before starting the disc, there occurs a problem that the start-up of the unit is certainly delayed by a time required for the displacement of the head.

Furthermore, in the method in which a head displacement instruction is issued simultaneously with the starting of the disc and the instruction is made valid only for a predetermined period if where the rotation of the disc is not detected, the above-described problems could be solved in theory. In actuality, though, the timing at which the displacement of the head is started and the time at which displacement is performed are difficult to set up and control. If these factors are not set up appropriately, various problems tend to occur particularly when strong adsorption and the like occur, so that the starting of the disc does not proceed smoothly, time required for the starting is prolonged considerably, and run away of the head occurs. It is also a problem in that it becomes impossible to lift the head when there is a failure to preclude absorption/sticking, because the displacement of the head is limited only for a predetermined period of time.

SUMMARY OF THE INVENTION

It is, therefore, an object of the present invention to solve the above-described problems involved in the conventional techniques by an apparatus and method which are as simple as possible and provide a system for starting a disc in a disc storage unit which can start the disc more certainly and smoothly than in the conventional manner when adsorption or adhesion of the head occurs.

In order to achieve the above and other objects and ends, according to the present invention, a disc storage unit includes rotation checking means for checking whether or not rotation of a disc occurs, head slight-displacing means for slightly displacing the head by a predetermined minute amount, wherein at first a driving force of rotation is applied to the disc, then the rotation checking means detects presence or absence of rotation of the disc, and, if no rotation is detected, the head is displaced slightly in a state in which the driving force of rotation is applied to the disc. These operations are repeated up to a predetermined number of times until rotation of the disc is detected or an error is noticed when the predetermined number is reached.

As for the rotation checking means in the above apparatus, a detector or a circuit to be used exclusively for the purpose may be provided. However, in order to simplify as much as possible the overall construction of the disc storage unit, it is advantageous to appropriately use a position sensor for a rotor originally incorporated in a spindle motor for driving the disc, an index pulse generator and the like.

Also, with respect to the slight-displacing means, it is advantageous to use an actuator for operating a head as is the case of a conventional disc storage unit instead of employing a mechanism or actuator for exclusive use, and it is also desirable to cause an actuator to effect slight displacement by software of a processor originally incorporated in the unit instead of providing a circuit for slight displacement. For the amount of slight displacement by the slight-displacing means, a minute amount as large as the pitch between 2 to 3 tracks is practically sufficient.

Upon slight displacement of the head by both means when the rotation of the disc is not detected, it is possible to set up a certain time limit to the motion of detecting the rotation by the rotation checking means, and it is advantageous for reducing time required for starting and promoting rise of the unit to speed up the detection motion as fast as possible and repeat associated motions of both means several times in a short cycle until starting is successful. The motion of the slight displacement of the head in the present invention is carried out in a state where a displacing (rotational) force is applied to the disc. In this case, it is advantageous that the driving force to be applied to the disc at the same time with the motion of the slight displacement of the head being increased temporarily in the case where the construction of the head supporting system allows.

Also, in the system for starting a disc according to the present invention, adsorption or adhesion of the head is removed by displacing the head. However, in the system of the present invention, the displacement of the head is limited only to the case where no rotation is detected by the rotation checking means after initiating application of a rotational drive force to the disc. From this it follows that in a normal case where no adsorption or the like does occur, the disc is started without displacing the head to speed up start-up of the disc storage unit, and at the same time the amount of displacement of the head is limited to a predetermined minute amount by the slight-displacing means in the above-described construction, thus overcoming disadvantages that the head runs away erroneously as is the case of a conventional disc storage unit no matter how strong adsorption or the like is, reducing time required for the displacement of the head and minimizing the possibility that the head arm and the like are distorted too much and damage surfaces of the disc due to the distortion.

The driving of the actuator for the head by the slight-displacing means may be strengthened, if desired. In addition to the slight displacement of the head a driving force of rotation is applied to the disc simultaneously, and therefore strong adsorption or the like of the head can be removed almost certainly by a synergistic effect.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 2:
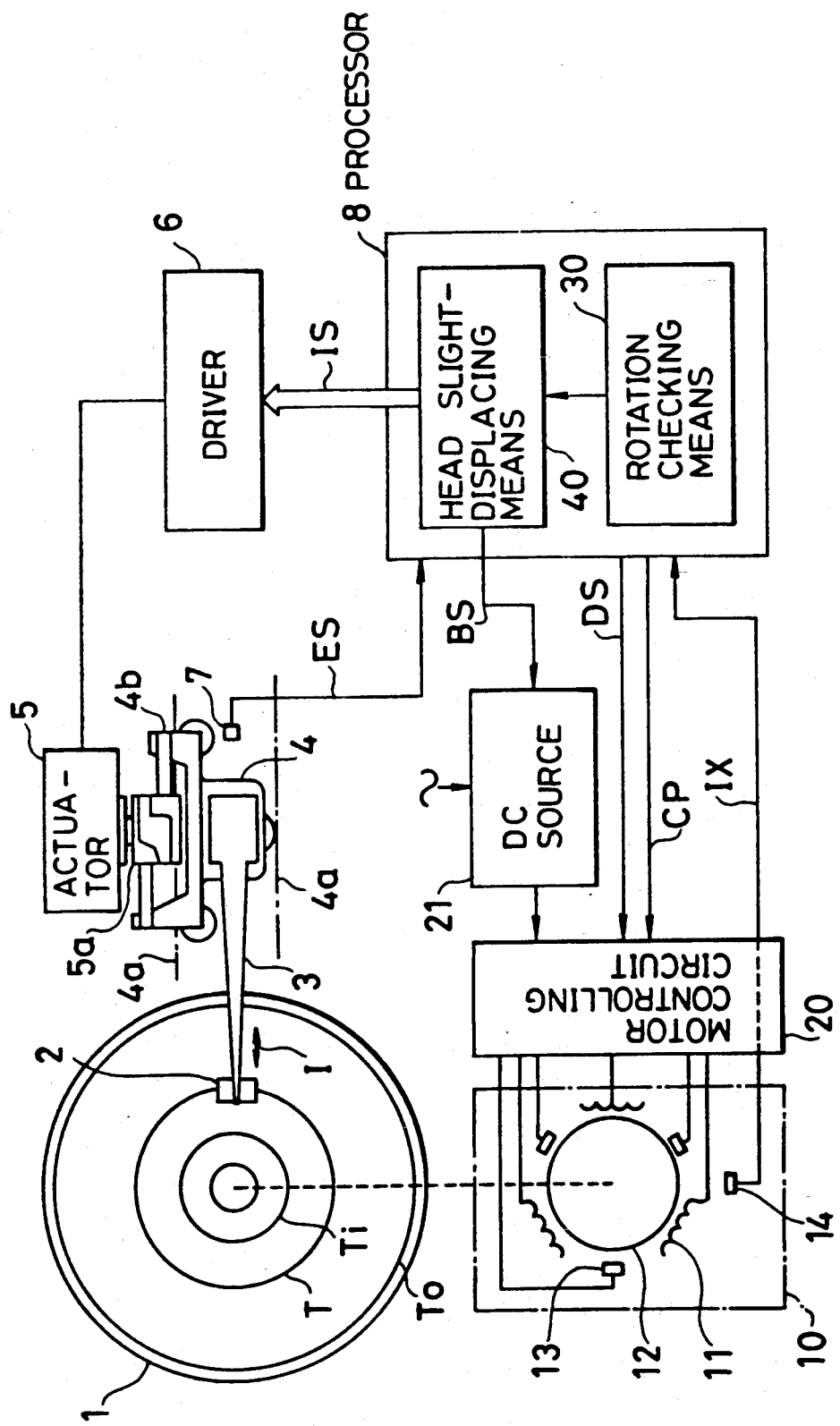
FIG. 2 is a block diagram showing an embodiment of a disc storage unit to which a system for starting a disc according to the present invention is applied.
Figure 3:
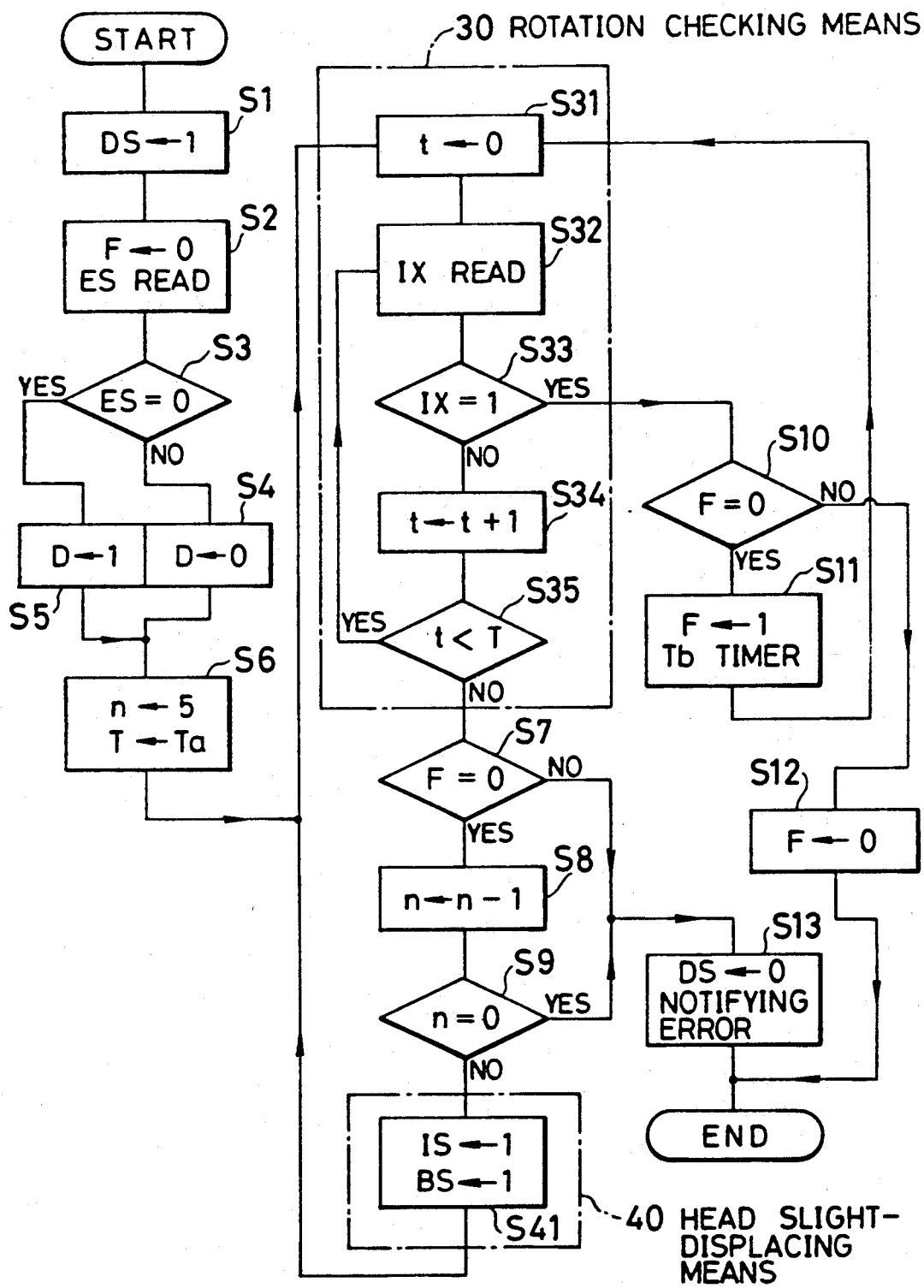
FIG. 3 is a flowchart illustrating an operation of the disc storage unit shown in FIG. 2.

FIG. 2 is a block diagram which shows an embodiment of a disc storage unit to which a system for starting a disc according to the present invention is applied, and FIG. 3 is a flowchart which illustrates overall operation of the disc storage unit including rotation checking means and head slight-displacing means. In this embodiment, the disc storage unit includes a hard disc of an air pressure-lifting type.

In the embodiment shown in FIG. 2, a disc 1 is shown at an upper part on the left side of FIG. 2. On the disc 1 are defined a number of tracks T for recording data information between a radially outermost track To and a radially innermost track Ti. A head 2 for reading out and writing the data information from and into the tracks T is attached tiltably to a tip of an arm 3 made of a thin plate spring as usual with a sliding surface of the head 2 opposing a surface of disc 1. The arm 3 has a relatively broad base that is attached to a carriage 4 guided on a pair of rails via rollers or the like and movable in the right hand and left hand directions in FIG. 2.

The carriage 4 is mechanically closely coupled to an actuator 5, which is for example a rotary stepping motor, for controlling the position of the head 2. Both ends of a thin metal band 4b are wound around a capstan 5a and fixed to a spindle of the motor and are fixed to a protrusion of carriage 41. By the rotation of the actuator 5 in one direction or the other the head 2 can be operated at any position in the radial direction of the disc. In this embodiment, a sensor 7 such as a photo sensor or the like is provided for detecting whether or not the head 2 reaches the position of the radially outermost track To. The actuator 5 is provided with a driver 6.

As is well known, the disc storage unit is a microcomputer and a processor 8 is incorporated therein for controlling the whole system. Rotation checking means 30 and head slight-displacing means 40 according to the present invention are incorporated in the processor 8 as software as schematically shown in FIG. 2. At the time of operating the head slight-displacing means, the processor 8 issues a slight-displacing instruction Is and supplies it to the driving circuit 6 for the actuator 5 so that the head 2 can be displaced by a predetermined minute amount.

A spindle motor 10 which drives disc 1 is usually an electric motor which consists of a stator provided with a coil 11 of a three phase construction in this embodiment and a rotor 12 connected to the disc 1. As usual, the spindle motor 10 includes a sensor 13 such as a Hall element for detecting the position of the rotor 12 and a pulse generator 14 which generates an index pulse IX in synchronism with the rotation of the disc 1. The spindle motor 10 is provided with a motor controlling circuit 20 which switches on and off and controls current to the stator coil 11 in synchronism with a signal detected by a rotor position sensor 13 under voltage applied by direct current source 21. The motor controlling circuit 20 starts and stops the driving of the spindle motor 10 based on the driving instruction DS supplied from the processor 8 so that the spindle motor 10 can be controlled at a constant speed designated by the frequency of a clock pulse CP.

The operation of the disc storage unit shown in FIG. 2 will be described with reference to the flowchart illustrated in FIG. 3. The flowchart illustrates the operation of the software in the processor 8 and, operation steps of the rotation checking means 30 and the head slight-displacing means 40 are encircled by a dashed and dotted line in FIG. 3.

The sequence shown in FIG. 3 is started when the disc storage unit is energized for start-up. In the first step S1, the driving instruction is set to "1" which is supplied to the motor controlling circuit 20 to cause the spindle motor 10 to start the disc 1. At the same time, the spindle motor 10 is given a final speed target by the clock pulse CP, and if there occurs no adsorption or adhesion the disc 1 can be started smoothly.

Subsequently steps S2 to S6 are steps for preparation of the rotation checking means 30 and the head slight-displacing means 40. At the first step S2, a flag for controlling the sequence is set to "0" and, in order to recognize the present position of the head 2, an end detection signal ES is read out from the radially outermost track detecting sensor 7. At step S3, it is judged whether or not the signal ES is "0" and when the judgement in step S3 is negative, that is, when the head exists in the vicinity of the radially outermost track, a direction flag D is set to "0" which designates operation toward the radially inner side in step S4, and when the judgement is affirmative, the direction flag D is set to "1" to designate operation toward the radially outer side in step S5.

In the last step S6, a variable n which is to define a number of repetitive operations of the rotation checking means 30 and the head slight-displacing means 40 is set to, for instance "5" and time T is set to a value of Ta in order to designate time of operation of the rotation checking means 40. After step S6, the sequence is shifted to the operation of the rotating checking means 30.

The rotation checking means 30 used in this embodiment is designed such that presence or absence of the rotation of the disc 1 can be checked utilizing the above-described index pulse IX since the index pulse is used in disc storage units almost without exception. In the first step S31, time variable t is reset to "0". In the next step S32, the index pulse IX is read out and presence or absence of the rotation of the disc 1 is checked in the subsequent step S33. In the case where the index pulse IX has not yet been reached, operation is shifted from step S33 to step S34 where time variable t is set to a value larger by 1, and then in step S35 it is judged whether or not the time variable has reached time T. So long as the judgement is negative, the sequence goes back to step S32 and the same operation is repeated.

As a result of operation of the rotation checking means 30, when the disc 1 operated in the preceding step S1 has started its rotation even slightly, the result of judgement in step S33 is affirmative and the sequence is shifted to step S10 et seq described below. However, in the case where adsorption or adhesion of the head 2 occurs to prevent the rotation of the disc 1 and no index pulse IX is detected in the designated time T, the sequence is shifted to the operation of the head slight-displacing means 40 via steps S7, S8 and S9.

The operation time T for the rotation checking means 30 is determined empirically, for instance, in response to the frequency of the index pulse IX as in this embodiment. In practicing the present invnetion, it is preferred that the operation time T is set to a value as short as possible, for instance, not longer than 1 second. Of course, in order to set the operation time T to a much shorter value, the detection signal from the sensor 13 for detecting the position of the rotor for the spindle motor 10 which signal has a natural frequency shorter than the index pulse IX may be obtained from the motor controlling circuit 20 despite some trouble and supplied to the processor 8 in place of the index pulse IX.

When the disc 1 is not in rotation and the value of the time variable t has reached the designated time T, operation is shifted from step S35 to step S7 where it is judged whether or not flag F is "0". In the present case, the result of the judgement is affirmative and operation is shifted to step S8 and the variable n which indicates the number of repetitive operations is substracted by 1, and further it is judged whether or not the value of the variable n is "0" in step S9. In the beginning, the result of the judgement is, of course, negative and operation is shifted into operation step S41, the head slight-displacing means 40.

Figure 1A:
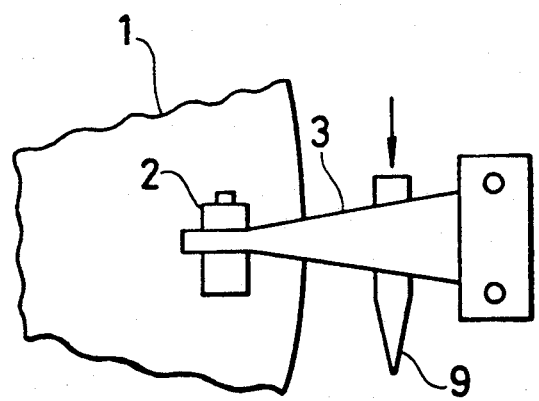
FIG. 1A is a plan view showing main components of a conventional lifter mechanism.
Figure 1B:
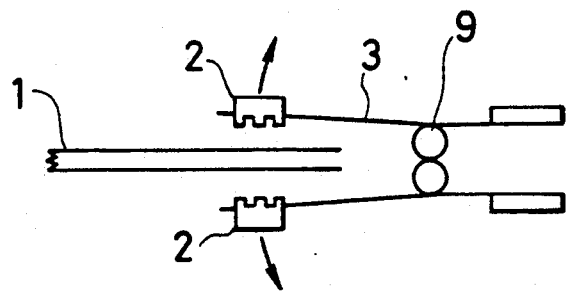
FIG. 1B is a side view showing main components of a conventional lifter mechanism.

In step S41, the processor 8 issues a slight-displacing instruction IS and supplies it to the driver 6 so that the actuator 5 slightly displaces the head 2 in the direction designated by the direction flag D in a predetermined minute amount indicated by an arrow I in FIG. 1. The amount of slight displacement is about 2 to 3 times the intertrack pitch, usually an amount on the order of several tens of micrometers (μm) is sufficient. In this embodiment, a stepping motor is used as the actuator 5, and assuming that operation of one step corresponds to one intertrack pitch, it is sufficient to only switch slight-displacing instruction IS consisting of data of several bits 2 to 3 times.

In this embodiment, since direction I of slight displacement corresponds to longitudinal direction of the arm 3 which supports the head 2 as shown in FIG. 2, and the arm 3 has a maximum strength in its longitudinal direction, there is no fear that the arm 3 is distorted greatly or that surfaces of the disc are damaged by the head even with a sufficient amount of slight displacement. However, it is preferred to make the amount of slight displacement small in order to prevent excessive deformation of the arm 3. The head 2 is supported, for instance, by an arm of a rocking type since the direction of slight displacement does not always coincide with the longitudinal direction of the arm.

The latter half of step S41 is designed for such cases and removal of adsorption or the like of the head is facilitated by temporarily increasing rotation torque of the spindle motor 10. For this purpose, as shown in FIG. 2, a torque increasing instruction BS is supplied from the processor 8 to the direct current source 21 only for a short time and the applied voltage is increased by, for instance, about 50 to 100% to temporarily increase the torque of the spindle motor 10. The time for which the torque increasing instruction BS is given is usually not longer than ½ second, which is sufficient for the purpose.

After the operation of slight displacing in step 41 as described above, the sequence goes back to the first step S31 for the rotation checking means 30. Since the operation of the head slight-displacing means 40 is always performed under normal driving torque or the above-described increased driving torque, the disc 1 starts its rotation as soon as adsorption or the like of the head is removed, and the rotation of the disc 1 is confirmed by the second operation of the rotation checking means 30. In the case where adsorption or the like of the head 2 is not removed even by the operation of the head slight-displacing means 40, the variable n is substracted one by one sequentially and the operations of the both means 30 and 40 are repeated at most, for instance, 5 times. If the removal of adsorption or the like of the head is unsuccessful with the above measure, the sequence is shifted from step S9 to step S13 via the loop, and the driving instruction DS is set to "0" to stop the spindle motor 10 and the occurrence of error is noticed to a computer (not shown), thus concluding the operation. On the contrary, in the case where there is no abnormality such as adsorption or the like from the beginning or, if any, such is removed as the result of the operation of the head slight-displacing means 40 so that the disc 1 can be rotated, the sequence is shifted from step S33 in the rotation checking means 30 to step S10.

In this embodiment, even if the disc 1 is successful in starting, this fact is confirmed again. For this purpose, it is judged whether or not flag F is "0" in step S10. In the beginning, the result of the judgement is affirmative and the operation is shifted to step S11 where flag F is set to "1" and a so-called soft timer operation is performed with a time limit of Tb. The time limit Tb of the timer operation is desirably set to a time value, for instance, that required for speeding up to normal rotation of the disc 1. After the timer operation, the sequence is shifted back to the first step S31 for the rotation checking means 30.

When the rotation of the disc 1 is confirmed again, the sequence enters step S10 from step S33 for the rotation checking means 30. This time, the operation is shifted to step S12 since flag F is set to "1", and the overall operation is concluded after resetting flag F to "0". In the case where the rotation of the disc 1 is not confirmed, the sequence is shifted from the rotation checking means 30 to step S7 and it is concluded via the operation of step S13 since flag F is set to "1".

As stated in the foregoing, according to the present invention, a disc storage unit includes rotation checking means for checking whether or not rotation of a disc occurs, head slight-displacing means for slightly displacing the head by a predetermined minute amount, and at first the disc is started and then the rotation checking means detects presence or absence of rotation of the disc, and the head is displaced slightly in a state in which rotational driving force is applied to the disc by spindle 10. The operation of the rotation checking means and the head displacing means are both repeated up to a predetermined number of times until rotation of the disc is detected or an error is noticed when the predetermined number is reached. By the above construction, the following effects can be obtained.

(a) Slight displacement of the head is limited to the case where at first the disc is caused to start but the rotation of the disc is not detected and therefore the head is not subjected idly to slight displacement when it is in a normal state where there occurs no adsorption or adhesion, the disc is started smoothly to speed up the start-up of the disc storage unit. In addition, as compared with a conventional system in which the head is always displaced before the disc is caused to start, there is no possibility of damaging surfaces of the disc. Since the occurrence of adsorption and the like is in a probability of at most once in several months or several years, the system of the present invention is much more rational.

(b) Since the amount of slight displacement can be limited to a constant minute amount on the order of usually several tens of micrometers (μm) by using the head slight-displacing means, there occurs no problem such as running away of the head as is the case of a conventional disc storage unit no matter how strong the adsorption or the like is. At the same time, there is substantially no possibility that there occurs excessive distortion of the head arm and the like and also damage of the head or surfaces of the disc based thereon.

(c) As compared with the conventional system in which a spindle motor is used which can be started at very high speed and high torque and the disc is accelerated after forcibly peeling off the head from a surface of the disc, the system of the present invention is free of damage to the head and surfaces of the disc and a cheap ferrite magnet can be used in place of a costly rare earth magnet in the spindle motor, thus reducing its price greatly.

(d) In the system of the present invention, even when the head adsorbs on the disc at the radially innermost track, it is sufficient for the spindle motor to have low torque such that no damage occurs on the head or surfaces of the disc, and therefore there is entirely no fear of such damage and the cost of the spindle motor can be decreased to a level lower than the conventional ones to thereby improve economical advantage of the disc storage unit.

(e) Preferably, as in the disclosed embodiment, the rotation checking means and head slight-displacing means are incorporated in the processor of the disc storage unit as software, which makes it possible to practice the present invention easily with the same mechanical components as used conventionally.

(f) Since the actuator for displacing the head is driven sufficiently strongly by the head slight-displacing means and the slight displacement of the head is performed in a state where the disc is under driving force, adsorption and adhesion of the head on surfaces of the disc can be removed almost certainly. Even when the head adsorbs or adheres strongly after the disc storage unit is left as it is for a long time at a high temperature and at a high humidity, the disc can be started almost always successfully by repeating operation of the rotation checking means and head slight-displacing means as described above.

(g) In the case where the direction of slight displacement does not coincide with the longitudinal direction of the head arm, possibility of the occurrence of damages on the head and surfaces of the disc can be minimized by making the amount of slight displacement small as described in the embodiments and by taking measure of increasing the torque of the spindle motor to thereby prevent excessive distortion of the arm.

The invention has been described in detail with respect to the disclosed embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A system for starting rotation of a disc in a disc storage unit including a disc, a head mounted for reading from and writing to the disc, and a disc driving mechanism for applying a driving force of rotation to the disc, comprising:
    rotation checking means for checking whether or not the disc is rotating;
    head displacing means for slightly displacing the head by a predetermined minute amount if no rotation of the disc is detected by said rotation checking means when a driving force of rotation is applied to the disc by the disc driving mechanism; and
    control means for causing a repetitive operation of both said rotation checking means and said head displacing means up to a predetermined number of times.

2. A system as claimed in claim 1, further comprising means for temporarily increasing the driving force of rotation concurrently with the slight displacement of the head caused by said head displacing means.

3. A system as claimed in claim 2, wherein the disc has a plurality of concentric tracks for storing data and adjacent tracks are separated by a predetermined intertrack pitch, and the predetermined minute amount of displacement of said head caused by said head displacing means is about 2 to 3 intertrack pitches.

4. A system as claimed in claim 1, wherein said control means comprises an error notice means for noticing an error in response to a failure of said rotation checking means to detect rotation of the disc after said control means causes the predetermined number of repetitive operations.

5. A system as claimed in claim 1, wherein the disc driving mechanism includes a spindle motor incorporating a rotor, and said rotation checking means comprises a sensor for detecting a position of the rotor incorporated in the spindle motor.

6. A system as claimed in claim 1, wherein said head displacing means comprises an actuator for displacing said head.

7. A system as claimed in claim 1, wherein said head displacing means further comprises a digital processor for controlling said actuator for slightly displacing the head.

8. A method of starting rotation of a disc in a disc storage unit having a disc, a head and a disc driving mechanism which applies a driving force of rotation to the disc, comprising:
    checking whether or not rotation of the disc occurs in a state in which the driving force of rotation is applied to the disc;
    counting the number of repetitive operations for said checking step in response to no rotation of the disc;
    displacing the head slightly by a predetermined minute amount while the driving force of rotation is applied to the disc if not rotation is detected by said checking step; and
    repeating the above, up to a predetermined number of times.

9. A method as claimed in claim 8, further comprising noticing the occurrence of error when the number counted by said counting step corresponds to the predetermined number.

* * * * *